United States Patent Office 3,614,888
Patented Oct. 26, 1971

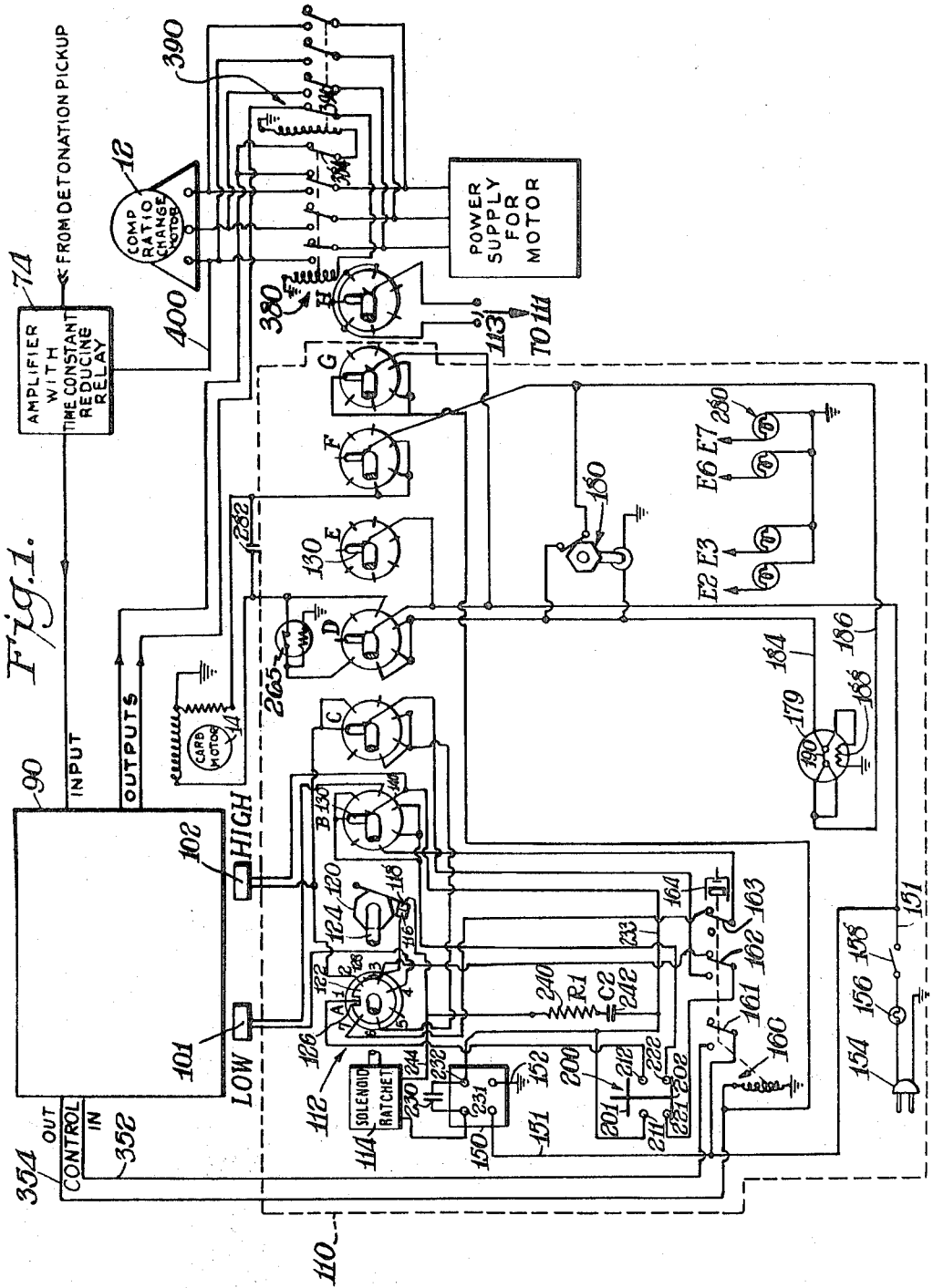

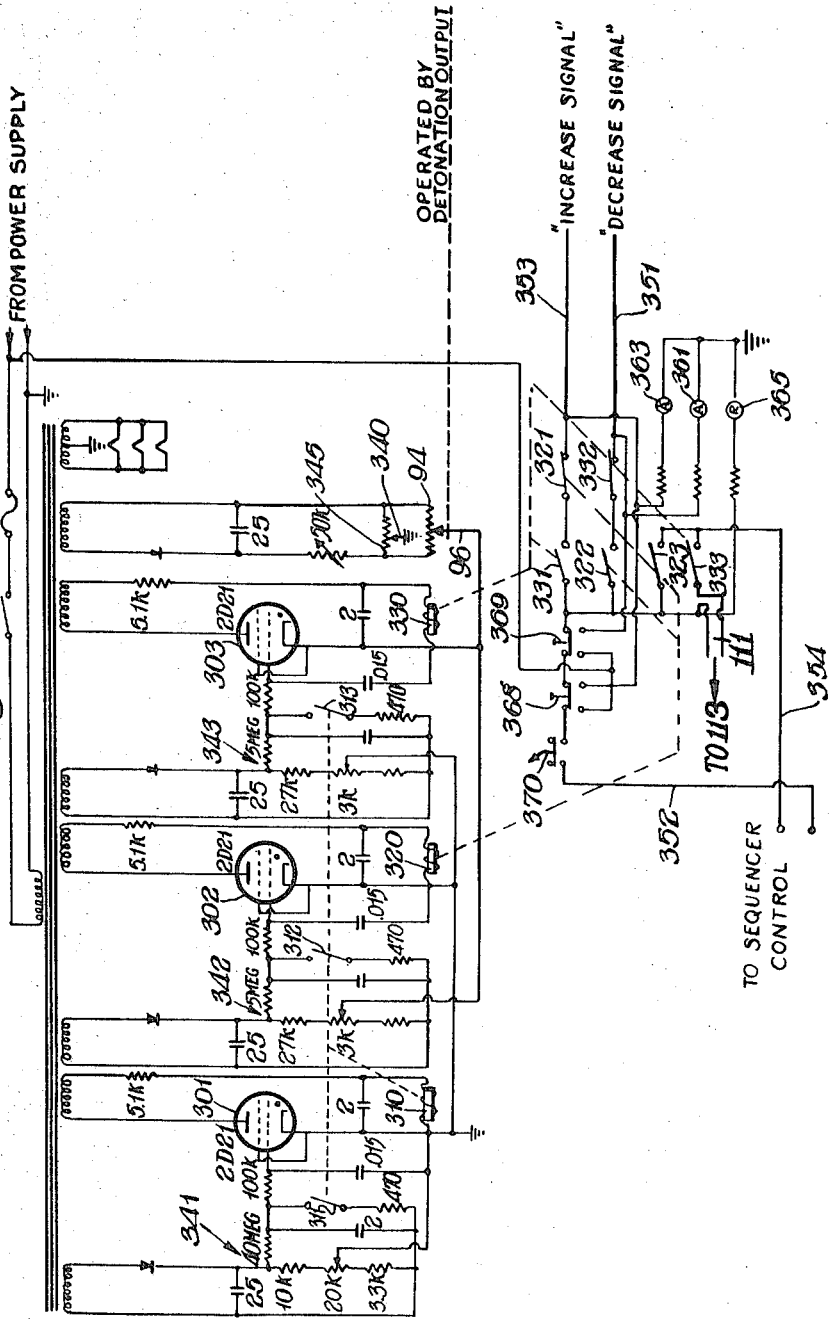

3,614,888
MAXIMUM KNOCK DETERMINING METHOD
AND APPARATUS
John T. Jones, Ardsley, and Gilbert C. de Malvilain, West
Nyack, N.Y., assignors to Ethyl Corporation, New
York, N.Y.
Filed Jan. 6, 1969, Ser. No. 789,308
Int. Cl. G01n 33/22
U.S. Cl. 73—35                                            5 Claims

ABSTRACT OF THE DISCLOSURE

Automatic knock testing of gasoline with engine having automatic compression ratio control that changes compression ratio to maintain predetermined knock intensity, is effected with quicker and simpler maximum knock fuel-air ratio search that first lowers fuel-air ratio and then increases it at a fairly rapid rate, the increasing being terminated when the compression ratio control stops calling for a decrease in compression ratio, and then an adjustment is made for overshooting of the fuel-air ratio increase. Alternatively the increase in fuel-air ratio can be effected in steps at least about 10 seconds apart, these steps being terminated when the compression ratio decrease steps pause for at least about the same length of time as the spacing between fuel-air ratio increase steps. No adjustment is needed with this alternative.

---

The present invention relates to the testing of gasolines for antiknock ratings, and is an improvement on the testing shown in U.S. Pat. 3,383,904 granted May 21, 1968.

Among the objects of the present invention is the provision of a novel testing sequence and apparatus which enables more rapid and accurate testing of the gasoline.

Additional objects of the present invention include the provision of a novel gasoline testing apparatus that is relatively simple to construct.

The foregoing as well as still further objects of the present invention will be more fully understood from the following description of several of its exemplifications, reference being made to the accompanying drawings wherein:

FIGS. 1 and 2 are schematic drawings of portions of a testing circuit illustrative of the present invention.

The present invention is concerned with automatic adjustment of the fuel-air ratio of the combustion mixture supplied to a gasoline knock testing engine having automatic compression-changing mechanism that automatically changes the compression ratio of the engine to maintain a predetermined intensity of knocking. Such a combination is shown for example in Pat. 3,383,904, the automatic compression ratio adjustment being more particularly described in connection with its FIGS. 3 and 4.

According to one aspect of the present invention the fuel-air ratio is automatically adjusted to that at which maximum knocking takes place, by first sharply lowering the fuel level and leaning the fuel-air ratio to below any maximum knock value than can be expected, and while keeping the automatic compression-changing mechanism in operation, raising the fuel-air ratio at a rate corresponding to about 0.02 to 0.04 millimeter increase in fuel level per second so long as the compression ratio keeps diminishing, immediately terminating the raising of the fuel-air ratio when the compression-changing mechanism stops calling for a decrease in compression ratio, and adjusting for overshoot of the fuel-air ratio increase.

Referring now to the appended drawings, FIGS. 1 and 2 are revisions of FIGS. 3 and 4 of Pat. 3,383,904, and show one way to automatically effect the automatic maximum knock fuel-air ratio determination of the present invention. The various components of FIGS. 1 and 2 are connected in a system generally described in that patent, and that description is incorporated in the present specification as though fully set forth therein. The components of FIGS. 1 and 2 carried forward from that patent still carry the reference characters applied to them in the patent.

The control system of FIGS. 1 and 2 merely includes a deviation controller which is essentially FIG. 2, and a sequencer which is principally FIG. 1. The maximum knock structure including its switch 250 and the recorder and timing circuits associated with it in the patent are omitted, the high and low limit switches 101, 102 for the compression ratio being mounted on the engine itself. Two more switch segments G and H have been provided in the stepping switch assembly 112, along with a disabling circuit 111, 113 and a normally closed time-delay switch 265.

As in the patent the deviation controller of FIG. 2 receives knock signals from the knockmeter of the test engine, periodically compares them with a predetermined signal intensity, and delivers pulses to a compression ratio adjusting motor 12 when needed to bring the knock signal intensity closer to the predetermined intensity. Should the knock signals be too strong the deviation controller delivers a decrease signal to the compression ratio adjusting motor, and should they be too weak an increase signal is delivered. A fuel-air ratio changing motor 14 is also provided to lift or lower the carburetor and thus cause more or less fuel to be sucked into the engine intake along with the air.

As in the construction of the patent, the apparatus of the present FIGS. 1 and 2 is placed in operation by pressing reset switch 200, which is of the spring-return type, to bring the sequencer into the illustrated position 1, after which this switch is released. In position 1 segment G completes a connection from power lead 151 through terminal 1 of that segment to the winding of relay 160. This actuates relay 160 which through its armature 161 energizes lead 352 from power lead 151, and as shown in FIG. 2 thus provides the energy for the increase and decrease signals. In the meantime the release of reset switch 200 closes an energizing circuit for the ratchet solenoid 114. This energizing circuit runs from lead 244 through contacts 118, 116, disc 122 of segment A, terminal 2 of segment A, terminal 1 of segment C, center contact of segment C, actuated armature 162 of relay 160, terminals 221, 222 of the reset switch, terminal 1 of segment B, center contact of segment B, lead 233 and terminal 232. This steps the sequencer to position 2 where as in the patent the bulk of the compression ratio adjusting action is completed. When this action has brought the knock intensity so close to the predetermined value that it is within the dead band to which the comparing network of FIG. 2 no longer responds, no correction pulse will be delivered to leads 351, 353 or 354, and the time delay of relay 160 runs out. The relay accordingly returns to the illustrated position, at which its armature 162 completes an energizing circuit that steps the solenoid 114 to position 3. This energizing circuit is the same as the corresponding circuit of the patent.

Again as in the patent, the relay 160 remains deenergized while the stepping switches are in position 3, but switch segment D then completes a circuit from power lead 151 to the lowering winding of the carburetor motor 14. The lowering of the carburetor proceeds until it causes the closing of low limit switch 101, this in turn establishing an energizing circuit as in the patent, to terminal 4 of switch segment A, causing the solenoid to advance the stepping switches to position 4. This stops the downward movement of the carburetor, and also establishes through terminal 4 of segment D, lead 184, normally closed delay switch 179, lead 186, center contact of segment F and terminal 4 of segment F, energization for the upward movement of the carburetor motor 14. Also in position 4 segment G completes another energization circuit of relay 160, thus causing the relay to move its armatures into actuated position and again enabling the delivery of increase and decrease signals for the compression ratio change motor.

At position 4 a solenoid stepping actuation is effected by the completion of an energizing lead from terminal 6 of disc 122, terminal 4 of segment C, the center contact of segment C, actuated armature 162 of relay 160, terminals 221, 222, terminal 4 of segment B, center contact of segment B, and lead 223. The stepping switches will accordingly be stepped to position 6. The movement from position 4 to position 6 does not affect the upward travel of the carburetor motor or the control action on the compression ratio change motor.

As in the patent the carburetor 14 is first raised in a continuous run for a few seconds until delay switch 179 opens, and then this motor is raised in spaced steps by the interrupter 180 which bridges across the terminals of delay switch 179. When the fuel-air ratio is at maximum knock no further decrease signals are generated so that the time delay of relay 160 runs out and this relay returns to the deactuated position illustrated. This closes a solenoid stepping circuit from terminal 7 of segment A through the deactuated armature 163, terminal 6 of segment B, center contact of segment B and lead 233, causing the stepping switches to step to position 7. The upper travel of the carburetor is thus terminated. At position 7 however the carburetor motor is given a final downward actuation energized from power lead 151 through the center contact of segment D, terminal 7 of segment D and normally closed time-delay switch 265. After a time delay which can be as short as one or two seconds switch 265 opens, terminating the downward travel of the carburetor, and this compensates for overshoot of the carburetor in its upper travel.

To guard against having relay 160 stay actuated after the maximum knock level is reached by the carburetor, circuit 111, 113 through which compression ratio increase signals are delivered for the purpose of keeping relay 160 energized, is opened by segment H in all stepped positions except 1, 2, 3 and 7. Accordingly even if the upward overshoot of the carburetor reaches a point that triggers a compression ratio increase signal, this will not cause relay 160 to be reenergized, and will accordingly not interfere with the timing out of that relay.

When the carburetor lifting steps are about 3/10 of a millimeter in the above-described sequence, it has been discovered that an overshoot adjustment of one step will bring the fuel-air ratio very accurately back to maximum knock value and the entire maximum knock search is completed very rapidly. Thus the time needed for the stepping switches to reach position 7 after they first arrive in position 4 can be of the order of 3 minutes, even for fuels having a fairly rich maximum knock ratio and thus requiring more carburetor lifting.

The following is a summary of the sequencer steps in the construction of FIGS. 1 and 2:

Step position: Operation
(1) (Start) ____ Automatic compression ratio adjustment is energized and sequencer automatically stepped to position 2.
(2) _____ Automatic compression ratio adjustment is completed after which sequencer is automatically stepped to position 3.
(3) _____ Automatic compression ratio adjustment is deenergized and carburetor is lowered to low limit causing sequencer to automatically step to position 4.
(4) _____ Carburetor lowering is stopped, slow raising of carburetor is begun, and automatic compression ratio reduction is energized along with sequencer stepping.
(5) _____ Carburetor continues its upward movement with automatic compression ratio reduction, while sequencer continues its stepping to position 6.
(6) _____ Carburetor continues its upward movement with automatic compression ratio reduction until no further reduction is called for, whereupon sequencer is stepped to position 7.
(7) _____ Upward movement of carburetor is terminated and carburetor is given a downward correcting movement. Automatic compression ratio adjustment is kept deenergized, as is the stepping of the sequencer.

It has been found very effective to lift the carburetor at a rate averaging between about 0.02 and 0.04 millimeters per second, and this is readily accomplished by lifting it 0.2 to 0.4 millimeter in one second and then pausing for nine more seconds before repeating the lifting cycle. The lifting action can continue in such steps. As the fuel-air ratio approaches the maximum knock value, the knock intensity tends to increase and the compression ratio control delivers a succession of decrease signals to lower the compression ratio of the test engine.

Maximum knock determination is an extremely delicate task and it has been found impossible to carry out such determination automatically by merely following the knock intensity signals on a continuous basis.

It had previously been considered essential to incorporate inertia effects such as provided by the mechanical maximum-knock-sensing arrangement 250 in the patent. However in accordance with the present invention maximum knock adjustment is accurately established with very little time required to complete such establishing.

The maximum knock determination of the present invention is not restricted to the apparatus of FIGS. 1 and 2. Thus it is not necessary to go through a step such as that of position 2 in the apparatus of FIG. 1, where the compression ratio is adjusted before the maximum knock search is begun. Position 2 can accordingly be eliminated from the stepping switches. Such elimination of the preadjustment of the compression ratio has the added advantage of reducing the frequency with which the compression ratio may inadvertently become too high. Compression ratio adjustment can in this simplification effectively begin when the carburetor provides a very lean mixture and knock intensities are accordingly considerably below maximum.

The circuit construction of FIGS. 1 and 2 can be readily modified to permit the compression ratio to be increased at the beginning of the upward movement of the carburetor without interfering with the maximum knock search. For this purpose the disabling circuit 113 can be extended so that it keeps circuit 111 closed while the stepping switches are at position 4 as well as at positions 7, 1, 2 and 3, and a normally open time-delay switch inserted in the lead between terminals 4 and 5 of segment C, to hold the switches at position 4 for a few seconds before they step further. Such a hold at position 4 can also be used for the initial continuous upward run of the carburetor motor, so that the delay of time-delay switch 179 is then not needed.

Also in the illustrated arrangement position 5 is not needed so that this too can be eliminated. Another simplification is to arrange for the upward movement of the carburetor to be the same throughout, rather than having it start as an unbroken run followed by a series of small steps. The long run can be entirely eliminated or reduced to a smaller amount.

As another alternative embodiment the lifting of the carburetor in accordance with the present invention can also be made continuous throughout, with little or no stepwise lifting. Such a continuous rate would still be between 0.02 and 0.04 millimeter per second. If desired on the other hand, the lifting can be carried out in steps having a cycle other than the foregoing one second on and nine seconds off. So long as the average lifting rate is as indicated the maximum knock level will be rapidly and accurately found.

The time delay of time delay switch 265 can be made adjustable to compensate for variations in any particular test engine, compression ratio control or sequencing control.

The short period of time required to adjust to maximum knock in accordance with the present invention makes it particularly effective for use with automatic blending systems as described in Pat. 3,838,904 or in patent applications Ser. Nos. 377,192 filed June 23, 1964; 617,754 filed Jan. 24, 1967 (granted Dec. 23, 1969 as U.S. Pat. 3,458,598); and 577,560 filed Aug. 9, 1966 (granted Jan. 6, 1970 as U.S. Pat. 3,488,168). In such blending control combinations the sequential steps of the present invention can be followed by a step in which the compression ratio control is placed in operation by itself with such compression ratio adjustment connected to effect compensatory blending adjustments. The sequence control can in such an arrangement be clock operated so as to go through a maximum knock adjustment periodically as for example once every half hour. It can also be connected to insert extra fuel-air ratio adjustments when the compression ratio shows an appreciable drift. By merely leaving power switch 158 on in the sequence control of FIG. 1, any time the compression ratio gets high enough to close switch 102 the sequence will automatically step around to position 2 and thus begin another fuel-air ratio search. Where position 2 is eliminated the high limit switch 102 is then connected to step the switches to position 1 or 3 instead. The low limit switch 101 can be correspondingly provided with an extra pair of contacts connected between the terminals of segments A and B so as to cause this switch to start another fuel-air ratio search when the low switch is actuated and the stepping switches are in blending control position.

According to another aspect of the present invention, a highly accurate maximum knock determination is made without correcting for overshoot, by spacing the fuel level increase steps at least about 10 seconds apart. This is readily effected as by shaping the interrupter 180 to provide current pulses two seconds long and 13 seconds between pulses, for a total cycle time of 15 seconds. Timer 265 can then be omitted from the construction of FIG. 1. The individual fuel level increase steps are preferably between 0.05 and 0.10 inch.

In this modification a further saving can be accomplished by arranging for the sequencer to stop fuel-air ratio changes when the compression ratio pulses produced pause for about the same length of time as the spacing between the fuel-air ratio change steps. Thus with the foregoing 15-second cycle, the timer 164 of relay 160 is adjusted to time out in 13 seconds (the same time interval as between pulses of carburetor-raising current). The correction signals delivered to leads 351 and 354 are then generally more than five seconds long, gradually diminishing in length at first, and eventually sharply dropping to less than two seconds long before stopping completely. When a compression-ratio-correcting signal less than two seconds long is given, the timer 164 times out before the next pulse of current from the interrupter 180. The sequencer is thereupon tripped by relay 160 into position 7, and the octane rating read from the compression ratio that the test engine has at that time. In this embodiment of the invention both the timer 265 and the sequencer segment H can be omitted leaving leads 111 short-circuited together.

The deviation detection and control of the present invention can have other forms than that illustrated in FIG. 2. The construction shown in Ser. No. 730,234 filed May 20, 1968 is also very effective. If desired the various control actions can be carried out with logic circuits rather than those illustrated in FIGS. 1 and 2, and solid state devices can be used in place of the thermally actuated delay switches as well as to effect the stepping of the stepping switches.

Obviously many modifications and variations of the present invention are possible in the light of the above teachings. It is, therefore, to be understood that within the scope of the appended claims the invention may be practiced otherwise than as specifically described.

What is claimed:

1. In the process of adjusting to maximum knock the fuel-air ratio of the combustion mixture suplied to a gasoline testing engine having automatic compression-changing mechanism that changes the compression ratio of the engine to maintain a predetermined knock intensity, the improvement according to which the fuel-air ratio is first sharply lowered to below any maximum knock value that can be expected, then with the automatic compression-changing mechanism in operation the fuel-air ratio is increased at a rate corresponding to about 0.02 to 0.04 millimeter increase in fuel level per second, such increasing being continued so long as the compression ratio keeps diminishing, terminating the increase in fuel-air ratio when the compression-changing mechanism stops calling for a decrease in compression ratio, and adjusting for overshoot of the fuel-air ratio increase.

2. In an automatic gasoline testing apparatus having a gasoline engine, automatic compression ratio control means connected to adjust the compression ratio of the engine in response to a knock sensing device to keep the knock at a predetermined level, the apparatus also including a fuel-air adjustment control means for changing the fuel-air ratio of the engine by raising the fuel level, the improvement according to which the apparatus has a sequence control means that:

(a) applies a signal to the fuel-air ratio control means to make said control means lower the fuel-air ratio to a preset value below that at which any maximum knock can be expected, and then (b) applies a signal that connects the fuel-air ratio control means to a timing means that causes the fuel-air ratio control means to raise the fuel-air ratio at a rate corresponding to about 0.02 to 0.04 millimeter increase in fuel level per second, and simultaneously, actuates the compression ratio control means, and senses when the compression ratio control means makes no change in the compression ratio during a predetermined time interval, and then, (c) disconnects the fuel-air ratio control means from the timing means, and deactivates the compression ratio control, and then (d) applies a signal to the fuel-air ratio control means to reduce the fuel air ratio a predetermined amount.

3. In an automatic gasoline testing apparatus having a gasoline engine, automatic compression ratio control means connected to adjust the compression ratio of the engine in response to a knock sensing device to keep the knock at a predetermined level, the apparatus also including a fuel-air adjustment control means for changing the fuel-air ratio of the engine by raising the fuel level, the improvement according to which the apparatus has a sequence control means that:
   (a) applies a signal to the fuel-air ratio control means to make said control means lower the fuel-air ratio to a preset value below that at which any maximum knock can be expected, then
   (b) applies a signal that connects the fuel-air ratio control means to a timing means that causes the fuel-air ratio control means to raise the fuel-air ratio at a rate corresponding to about 0.02 to 0.04 millimeter increase in fuel level per second, also actuates the compression ratio control means to automatically apply compression ratio reductions as the fuel-air ratio is raised and senses when the compresion ratio reductions terminate, then
   (c) disconnects the fuel-air ratio control means from the timing means, deactivates the compression ratio control, and then
   (d) applies a signal to the fuel-air ratio control means to reduce the fuel-air ratio a predetermined amount.

4. In an automatic gasoline testing apparatus having a gasoline engine, automatic compression ratio control means connected to adjust the compression ratio of the engine in response to a knock sensing device to keep the knock at a predetermined level, the apparatus also including a fuel-air adjustment control means for changing the fuel-air ratio of the engine by raising the fuel level, the improvement according to which the apparatus has a sequence control means that:
   (a) applies a signal to the fuel-air ratio control means to make said control means lower the fuel-air ratio to a preset value below that at which any maximum knock can be expected, then
   (b) applies a signal that connects the fuel-air ratio control means to a timing means that causes the fuel-air ratio control means to raise the fuel-air ratio in small steps at least about 10 seconds apart, also actuates the compression ratio control means to automatically adjust the compression ratio as the fuel-air ratio is raised, and senses when automatic compression adjustments stop for a predetermined time, and then
   (c) disconnects the fuel-air ratio control means from the timing means and deactivates the compression ratio control.

5. In the process of adjusting to maximum knock the fuel-air ratio of the combustion mixture supplied to a gasoline testing engine having automatic compression-changing mechanism that changes the compression ratio of the engine to maintain a predetermined knock intensity, the improvement according to which the fuel-air ratio is first sharply lowered to below any maximum knock value that can be expected, then with the automatic compression-changing mechanism in operation the fuel-air ratio is increased in small steps at least about 10 seconds apart, such increasing being continued so long as the compression ratio keeps diminishing in steps spaced timewise less than the fuel-air ratio increase steps, and terminating the increase in fuel-air ratio when the compression-changing mechanism stops for at least the time between fuel-air ratio increase steps.

References Cited

UNITED STATES PATENTS

| | | | |
|---|---|---|---|
| 3,238,765 | 3/1966 | Beal | 73—35 |
| 3,383,904 | 5/1968 | Jones et al. | 73—35 |

JAMES J. GILL, Primary Examiner

PO-1050
(5/69)

UNITED STATES PATENT OFFICE
CERTIFICATE OF CORRECTION

Patent No. 3,614,888  Dated  October 26, 1971

Inventor(s) John T. Jones and Gilbert C. de Malvilain

It is certified that error appears in the above-identified patent and that said Letters Patent are hereby corrected as shown below:

Column 5, line 37, "3,838,904" should read
-- 3,383,904 --

Signed and sealed this 30th day of May 1972.

(SEAL)
Attest:

EDWARD M.FLETCHER,JR.
Attesting Officer

ROBERT GOTTSCHALK
Commissioner of Patents